United States Patent Office 2,966,497
Patented Dec. 27, 1960

2,966,497

ACETO METHYL POLYHYDRONAPHTHONE PROPIONIC ACIDS AND LACTONES AND PREPARATION THEREOF

Nicholas Thomas Farinacci, 3 E. 9th St., New York 3, N.Y.

No Drawing. Filed Mar. 25, 1957, Ser. No. 647,986

16 Claims. (Cl. 260—343.2)

This invention relates generally to the group of polyhydronapthone propionic acids and corresponding lactones and preparation thereof from the group of tertiary diphenyl carbinols and derivatives which are prepared from the group of primary starting materials, the pine resin acids. The group of pine resin acids are characterized as a natural group by the trans relationship between the 13-angular methyl group and the 8-tertiary carboxyl group and this relationship is found to extend to the group of tertiary carbinol derivatives of the related inventions referred to herein, thus providing a natural group of starting carbinols.

The invention relates particularly to aceto-methyl polyhydronapthone propionic acids and the corresponding lactones having the formulas

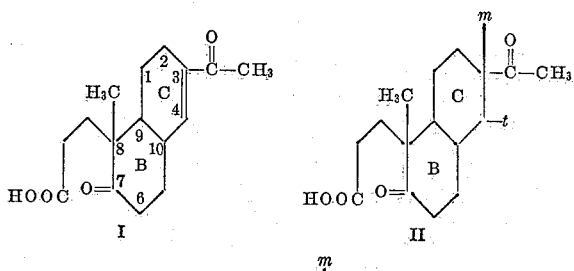

and

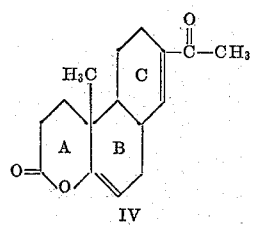

wherein as in II and III, $m$ and $t$ are each selected from the group consisting of hydrogen and halogen, and the preparation thereof, particularly from suitable intermediates derived from the pine resin acids such as the tertiary diphenyl carbinols having an isopropyl or aceto group in the 2-position or from the corresponding rearranged tertiary diphenyl methyl compounds or from the corresponding 7-keto-13-methyl polyhydrophenanthrene compounds and corresponding halides thereof prepared as described in copending applications Serial Nos. 610,623; 610,624; 610,625, filed Sept. 18, 1956, now Patents Nos. 2,830,093; 2,830,094 and 2,830,074 respectively, as continuations-in-part of applications Serial Nos. 416,433; 416,434; 441,646, respectively, filed March 15, 1954 and July 6, 1954 as continuations-in-part of applications Serial Nos. 198,893; 198,894 and 198,892, respectively, filed Dec. 2, 1950 the latter now abandoned and in copending application Serial No. 428,852, filed May 10, 1954, now Patent No. 2,830,075, as a continuation-in-part of application Serial No. 198,895 filed Dec. 2, 1950, now abandoned, and said descriptions and preparations of starting materials are hereby incorporated herein.

Accordingly, the production of subject polyhydronapthone compounds of the invention may be achieved starting from each of the above mentioned tertiary carbinols, the corresponding polyhydrophenanthrene-8-tertiary diphenyl methyl compounds or from the corresponding 7-keto-13-methyl-2-α-carbonylated polyhydrophenanthrene compounds of which the two latter having at least a double bond in the 8:1 position, but the carbinols having nuclei inert to oxidative degradation by virtue of saturation of ethylenic double bonds by halogen, hydrogen or halogen hydride or by aromatization of the C-ring portion thereof. The direct production from the tertiary carbinols is preferred.

It is an object of the invention to prepare products which are useful as intermediates for the manufacture of therapeutics or which intermedaites are therapeutics themselves, especially, for treatment of disorders related to deficiencies of the seminal organs, testicular and pituitary glands. For example, compound I promotes caponcomb growth and, therefore, it is useful for androgen therapy and II and III are intermediates for the preparation of I and IV as by suitably removing halogen or halogen hydride. Further, compounds such as I, being converted to IV and lactone IV reacted with such as methyl magnesium halide (Grignard) or with phenyl acetate-sodium hydride (as by procedures of Turner: Jour. Am. Chem. Soc. 69 726 (1947)) accordingly may be utilized as intermediates for the production of androgens having the (Δ⁴-3-keto structure as in the cyclopentanopolyhydrophenanthrenes) Δ (8,14)-7-keto structure for the A ring of the regenerated (from said lactones IV) tricyclic polyhydrophenanthrones described in copending application Serial No. 610,625 now Patent No. 2,830,074 having, for example, a formula

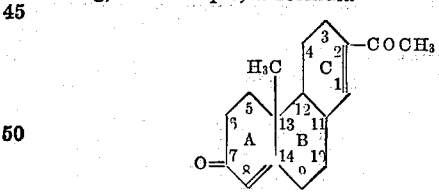

The corresponding polyhydrophenanthrene compounds are produced from the polyhydronapthone propionyl lactones of this invention which are derived from the halogenated dextropimaryl and the aromatized dehydroabietyl types of tertiary diphenyl carbinols.

Another object of the invention is the production of said polyhydronapthone compounds from corresponding 2-carbonylated such as the 2-aceto-8,13-dimethyl (or 2-carboxy-2,8,13-trimethyl) polyhydrophenanthrene-8-tertiary diphenyl carbinol halides prepared as described in copending application Serial No. 428,852 now Patent No. 2,830,075 and from the corresponding 2-isopropyl (or 2-vinyl or 2-hydroxy ethyl or 2-glycol) polyhydrophenanthrene tertiary diphenyl carbinols, prepared as described in copending applications Serial Nos. 610,623 and 610,624 now Patent Nos. 2,830,093 and 2,830,094 by suitable treatment as desirable or necessary of the nuclearly unsaturated tertiary carbinols with halogen addition reagents selected from the group of halogens and halogen hydrides including those containing chlorine, bromine, iodine and fluorine. The halogen addition reagents containing chlorine or bromine, that is, $Cl_2$, $Br_2$, HCl and HBr are preferred for the preparation of the corresponding starting carbinol halides having inert nuclei.

A halogenated carbinol so produced is reacted with a member of the hexavalent chromium compounds selected from the group of chromic trioxide, chromates, bichromates, chromyl compounds and their hydrates, preferably, in suitable inert solvents such as alkanoic acids, acid anhydrides, halogenated solvents such as chloroform, carbon tetrachloride and the like, and preferably in the presence of a member of the group of orthophosphate producing compounds selected from the ortho-, meta- and pyrophosphates including their acids, salts and anhydrides, thereby to provide appropriately neutral or acid or alkaline media for the reaction and also provide the immediate and substantially complete removal of trivalent chromium salts from the reaction zones and solution as an insoluble solid phase of chromic phosphates and resulting advantages provided by this removal. The reaction preferably may be conducted at relatively high temperatures in the range from about 50° to above about 100° C. more preferably above about 70° and preferably in the presence of dehydrating agents as described in copending application Serial No. 610,625, now Patent No. 2,830,074, wherein the several examples are noted to provide at lower temperature the corresponding polyhydronapthone compounds of this invention as side products and accordingly, provide further exemplification of the present invention.

The halogenated polyhydronapthone propionic acids suitably prepared as above may be separated and are converted to closely dependent halogenated lactones of the invention suitably by members of the group of dehydrating agents comprised in such as sulfuric and phosphoric acids and their anhydrides, organic acids and anhydrides such as acetic and propionic anhydrides and the like, acyl halides, phthalic anhydride, p-toluene sulfonic acid and the like.

The halogenated intermediate acids and lactones II and III produced as described above generally are converted by suitable modifications of dehalogenation or dehydrohalogenation procedures as by treatment of dihalides preferably with zinc and acetic acid and treatment of monohalides as with pyridine bases and the like and thereby to restore the unsaturated bonds and provide such halogen free compounds as I and IV and the like.

I have found it preferable to maintain temperatures during reaction below 100° C. and preferably above 70° C. for the production of maximum yields of said halogenated polyhydronapthone propionic acids and corresponding lactones.

In general the halogenated acids and lactones suitably may be converted to the corresponding halogen free derivatives of the invention as by removal of halogen or halogen hydride. This may be achieved by reagents disclosed above and in examples as by treatment of the halogenated compounds with zinc and acetic acid, or with pyridine and organic bases such as collidine and the like and other reagents may be used such as alkali iodides and alcohols, alkali reagents and the like such as are described, for example, by Houben "Die Methoden der Organischen Chemie," 2nd edition, Vol. 2, pp. 744-6 (1922).

The term hexavalent chromium compounds used herein includes the group of oxidizing chromium compounds, the chromic trioxide, chromates, bichromates and chromyl compounds, comprised under the term hexavalent applied thereto described as in Smith's Inorganic Chemistry, Chap. 50, pp. 949-59, Century Co., New York (1926). The term orthophosphate-producing compounds as used herein includes the group of ortho-, meta- and pyrophosphoric compounds, their hydrates and anhydrides comprised in the group of said phosphoric compounds as set forth in Chap. 30 of Smith's Inorganic Chemistry, loc. cit. Such compounds may be employed suitably for purposes of the invention.

Although a preferred scheme for the process of the invention comprises reaction of a suitably protected, as by halogen or halogen hydride, tertiary diphenyl carbinol, of such as the halogenated dihydro-1-pimaryl tertiary diphenyl carbinols or of a corresponding halogenated dextropimaryl tertiary diphenyl carbinol derived from the resin acids and having a formula

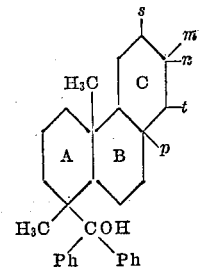

wherein Ph is phenyl, $s$, $t$ and $p$ are each selected from the group consisting of hydrogen and halogen, $m$ is selected from the group consisting of hydrogen, halogen and methyl and $n$ is selected from the group consisting of —$CH(CH_3)_2$, —$COCH_3$, —$CH=CH_2$, —$CHOHCH_3$, —$CHOHCH_2OH$, —$COOR$ (wherein R is selected from the group consisting of hydrogen, alkyl and aryl radicals) and —$CHpCH_2t$, said carbinol preferably being dissolved in such as acetic acid is reacted with a mixture of hexavalent chromic trioxide and an at least equivalent amount of orthophosphate-producing compound such as phosphoric acid the temperature during reaction being controlled preferably between 80 and 95° C. and the product halogenated acids being lactonized preferably as with $P_2O_5$, acetic anhydride or sulfuric acid, it will be immediately apparent to one skilled in the art that starting materials, proportions and concentrations of reactants, temperatures, reaction periods or solvents may be varied within wide limits. The hydrogen saturated and aromatized members of the group of starting carbinols which do not require the halogen addition reagent stabilization of their nuclei are converted to corresponding polyhydronapthone propionic acids and lactones in accordance with the above procedure illustrated, for example, by Example 6 of copending application Serial No. 610,625, now Patent No. 2,830,074 for the C-ring aromatized tertiary carbinol and producing the corresponding enolized form of polyhydronapthone propionic acid and lactone of the formulas

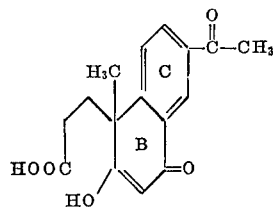

and

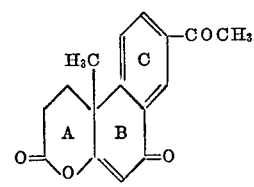

For the purposes of the invention suitable solvents may be selected from the group of alkanoic acids, tertiary alcohols and inert halogenated hydrocarbons such as chloroform, carbon tetrachloride and the like. Reaction temperatures in the range of 5 to 150° C. may be utilized and halogen free products of the invention may be obtained as with treatment of members of the group of dehalogenating and dehydrohalogenating reagents as set forth above. At the higher temperatures the reaction is substantially complete within a few minutes but with lower temperatures several hours may be required for a suitable degree of completion.

For purposes of the invention the lactones may be reconverted to corresponding acids of the invention as by treatment with inorganic alkali such as alcoholic NaOH and the like and the alkali salt which is produced on neutralization will produce the typical aceto- and carboxy-polyhydronapthone propionic acids of the invention.

The following examples serve to illustrate modifications of the invention without, however, limiting the invention to the modifications described therein.

EXAMPLE 1

To 210 grams of 7,8-dibromdihydro-1-pimaryl tertiary diphenyl carbinol, (1,2 - dibrom - 2 - isopropyl-8,13-dimethyl polyhydrophenanthrene-8-tertiary diphenyl carbinol), (prepared as in copending application Serial No. 610,624, now Patent No. 2,830,094) dissolved in 3 liters of glacial acetic acid there is added 900 grams of 85% aqueous orthophosphoric acid and 240 grams of dry $CrO_3$, portionwise, while stirring and regulating the temperature between 80 and 90° C. The reaction is completed by stirring the mixture for 30 minutes after the final addition of $CrO_3$ at about 85° C. The chromic phosphate precipitate is removed by filtration and washed with ether to recover organic residue. The filtrate is watered out with about 9 parts of water and organic residue is recovered by filtration, and drying. The residue is thoroughly washed with petroleum ether and acids are separated therefrom by aqueous alkali extraction of the ethyl ether solution. The acids may be precipitated by mineral acids and recovered as the brominated acid and lactone, II and III, analyzing 36.5% and 38.1% bromine respectively. III readily hydrolyzes to II. The bromine is removed by treating an aliquot such as 70 grams with 100 grams of zinc dust in 500 grams glacial acetic acid for 3 hours at 50 to 70° C., thus recovering the corresponding unsaturated mixture I and IV. IV treated with NaOH readily hydrolyzes to sodium salt of I. The unsaturated 3-aceto-8-methyl polyhydronapthone-8-propionic acid, I, $C_{16}H_{22}O_4$ recrystallized from 50–50 ether-alcohol has an acid number of 200, 69.1% C, 7.9% H, 23% O and an X-ray diffraction pattern having the interplanar spacings and relative intensities in Table I. S=strong, W=weak, V=very.

Table 1

| d (interplanar spacings) | Intensities |
| --- | --- |
| 13.72 | S |
| 9.12 | VW |
| 6.85 | VW |
| 5.46 | W |
| 4.56 | W |
| 4.22 | S |
| 3.82 | VVS |
| 3.43 | VS |
| 3.04 | S |
| 2.86 | VS |
| 2.31 | S |
| 2.08 | S |
| 1.94 | W |

EXAMPLE 2

18 grams of 7,8-dichlordihydro-1-pimaryl tertiary diphenyl carbinol (prepared as in copending application Serial No. 610,624, now Patent No. 2,830,094) in 500 cc. glacial acetic acid is treated with a mixture of 40 grams of 85% aqueous orthophosphoric acid and 40 grams of $P_2O_5$ and 40 grams of dry $K_2CrO_4$ portionwise, stirring and maintaining the temperature between 90 and 100° C. The recovered acetic acid filtrate is treated as in Example 1, and 12 grams of 3,4-dichlor-8-methyl-7-keto-3-aceto polyhydronapthalene-8-propionic acid, II, is isolated containing 20.4% Cl, 5 grams of this product is dechlorinated, with zinc and acetic acid as in Example 1, to yield 3.5 grams of 3-aceto-8-methyl Δ(3,4) polyhydronaphthone-8-propionic acid as in Example 1.

EXAMPLE 3

17 grams of 7-monochlordihydro-1-pimaryl tertiary diphenyl carbinol (prepared as in copending application Serial No. 610,624 now Patent No. 2,830,094) dissolved in 500 cc. of glacial acetic acid is treated with 80 grams of pyrophosphoric acid and 50 grams of $K_2Cr_2O_7$, portionwise, with stirring with an average temperature of 95° C. The acetic acid filtrate treated as in Example 1, to yield 10 grams of 3-chlor-8-methyl-7-keto-3-aceto polyhydronapthalene-8-propionic acid, II, 11.3% Cl. A 5 gram portion is dehydrohalogenated with pyridine on the steam bath to yield 4 grams of the unsaturated 3-aceto-8-methyl-8-propionic acid polyhydrodronapthone-7, IV, as in Example 1.

EXAMPLE 4

2 grams of 3,4-dibrom-8-methyl-3-aceto-7-keto polyhydronapthalene-8-propionic acid, II, dissolved in 100 cc. glacial acetic acid is treated with 2 cc. 95% $H_2SO_4$ and heated to 80° C. for 30 minutes. The lactone dibromide corresponding to Formula III, 38.1% bromine, is separated by extraction of the water-diluted reaction mixture with ether.

Similarly the mono- and dichlor- polyhydronapthalene propionyl lactones, corresponding to Formula III, are prepared, containing 21.4% Cl and 11.9% Cl, respectively.

EXAMPLE 5

2 grams of the unsaturated 8-methyl-3-aceto-7-keto polyhydronapthalene-8-propionic acid, I, obtained as in Example 1, is lactonized by treatment with 5 grams of $P_2O_5$ in 100 cc. acetic acid as in Example 4, to produce the corresponding lactone, Formula IV. This titrates to an acid number of 215.

EXAMPLE 6 polyhydronapthalene-8-propionic acid, I, is lactonized by treatment with 50 grams propionic anhydride to yield IV.

EXAMPLE 7

2 grams of 11,1-dibrom, 2,8,13-trimethyl-2-ethene polyhydrophenanthrene-8-tertiary diphenyl carbinol (brominated d-pimaryl tertiary diphenyl carbinol) dissolved in 500 cc. acetic acid which is treated with a mixture of 50 grams of $K_2Cr_2O_7$ and 80 grams of $H_3PO_4$ added portionwise with stirring with an average temperature of 90° C. The acetic acid filtrate is treated as in Example 1, to yield 1.5 grams of 10,4-dibrom-3,8-dimethyl-3-carboxy-7-keto polyhydronapthalene-8-propionic acid which on treatment with 5 grams $P_2O_5$ in 100 cc. glacial acetic acid yielded 1.3 grams of the corresponding dibromo-8-propionyl lactone.

EXAMPLE 8

10 grams of 7-carbomethoxy (or the 7-carbophenoxy) d-pimaryl tertiary diphenyl carbinol (prepared as described in copending application Serial No. 428,852 now Patent No. 2,830,075), dissolved in 200 grams of glacial acetic acid is treated (according to Example 4, of copending application Serial No. 610,625 now Patent No. 2,830,074) that is, reacted with 4 grams of bromine with stirring for 30 minutes. To the solution of resulting dibromide there is added 15 grams of 95% $H_2SO_4$ (or $P_2O_5$) and heat is applied for 30 minutes. To the resulting rearranged-carbinol-dehydrate (2-carbomethoxy) or (2 - carbophenoxy)-11,1-dibrom-2,13-dimethyl Δ(8,14) polyhydrophenanthrene-8-tertiary diphenyl methyl compound, there is added 38 grams of 85% aqueous $H_3PO_4$ and 10 grams of anhydrous CrO₃ powder with stirring for 30 minutes while maintaining the temperature below 60° C. There is recovered from the organic residue extracted with ethylether by washing with aqueous alkali 2 grams of the corresponding 3-carbomethoxy (or 3-carbophenoxy) - 10,4-dibrom-3,8-dimethyl-7-keto polyhydronapthalene-8-propionic acid, V, which on admixture with 5 grams of P₂O₅ and 100 cc. of glacial acetic acid produces 1.2 grams of the corresponding 8-propionyl lactone. Similarly, from the acid fraction of the product obtained from the 7-aceto-d-pimaryl tertiary diphenyl carbinol (in accordance with Example 5, of copending application Serial No. 610,625 now Patent No. 2,830,074) the corresponding 3-aceto-3,8-dimethyl-7-keto-4,10-dibrom polyhydronapthalene-8-propionic acid and corresponding lactone are recovered in accordance with the above.

The 2-hydroxyethyl (or 2-glycol)-2,8,13-trimethyl halogenated polyhydrophenanthrene-8-tertiary diphenyl carbinols (prepared as in copending applications Serial No. 610,623 now Patent No. 2,830,093 and Serial No. 610,624 now Patent No. 2,830,094) are converted as exemplified above to corresponding 3-aceto (or 3-carboxy)-3,8-dimethyl-7-keto Δ(4,10) polyhydronapthalene propionic acids and to corresponding lactones by dehydration of the acids, and either preliminary or subsequent halogen removal.

EXAMPLE 9

5 grams of dehydroabietyl tertiary diphenyl carbinol (according to Example 6, of copending application Serial No. 610,625 now Patent No. 2,830,074) dissolved in 200 cc. of glacial acetic acid is treated with 3 grams P₂O₅ and heated to 70° C. for 30 minutes. The resulting Δ(8,14) (11,1) (2,3) (4,12) -2-isopropyl-13-methyl polyhydrophenanthrene-8-tertiary diphenyl methyl compound is treated with 30 grams of 85% aqueous H₃PO₄ and 9 grams of anhydrous CrO₃ with stirring and heating for 2 hours to 85° C. The organic residue which is extracted with ethyl ether and washed with 500 cc. of 5% aqueous NaOH provides 3 grams of the Δ(9,1)(2,3)(10,4)(6,7) 3-aceto-5-keto-7-hydroxy-8-methyl polyhydronapthalene-8-propionic acid which is converted to 2 grams of the corresponding 8-propionyl lactone by admixture with 5 grams acetic anhydride in 200 cc. glacial acetic acid and heating to 80° C.

The nomenclature and numbering defined in this specification and claims for the phenanthrene series conform with the Journal of American Chemical Society 55, 3905 (1933) and those for the abietyl and pimaryl series conform with the Journal of American Chemical Society 60, 159 (1938) and Fieser and Fieser, Natural Products Related to Phenanthrene, Chap. II, 3rd ed. (1949), Reinhold Publishing Co., New York, N.Y.

The foregoing may be summarized as follows:

The starting tertiary carbinol may be represented by the formula

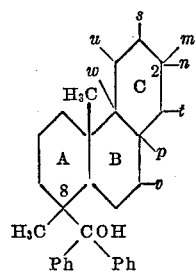

wherein the angular methyl and tertiary carbinol groups are in trans relation. This material is rearranged, dehydrated and oxidized at a temperature in the range of about 5° to about 150° C., preferably below 100° C.

In this process the resulting intermediate 7-keto polyhydrophenanthrene having the formula

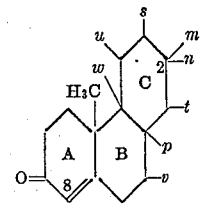

is oxidized by means of oxidizing agents, preferably a hexavalent chromium compound, in the range of 5° to about 150° C., preferably below about 100° C., and this produces a 3-substituted-13-methyl polyhydronapthalene-8-propionic acid and corresponding lactone of a formula selected from the group consisting of

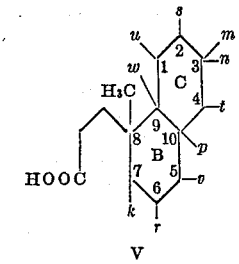

V and

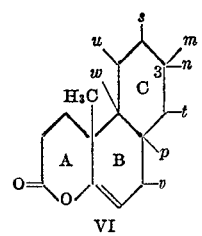

VI with the simultaneous loss of the 8-carbon atom from the oxidized 7-keto derivative as $CO_2$, and converting the 7-position to a carboxyl group which dehydrates to form the cyclic lactone.

In all the foregoing formulas $k$ is selected from the group consisting of =O, OH and one end of a double bond, $v$ is selected from the group consisting of =O, =H₂ and one end of a double bond, $w$ and $u$ are each selected from the group consisting of hydrogen and one end of a double bond, $s$, $t$ and $p$ are each selected from the group consisting of hydrogen, halogen and one end of a double bond, $m$ is selected from the group consisting of hydrogen, halogen, methyl, and one end of a double bond, said ends of double bonds being in a position selected from the group consisting of the $k$ and $r$, $r$ and $v$, $w$ and $u$, $s$ and $m$, $m$ and $t$, and $t$ and $p$ positions, $n$ is selected from the group consisting of —CH(CH₃)₂,

—COCH₃, —CH=CH₂, —CHOHCH₃,

—CHOHCH₂OH, —CH$p$CH₂$t$ and —COOR (wherein R is selected from the group consisting of hydrogen, alkyl and aryl radicals), and Ph is phenyl.

The group of inventions comprised in the copending applications, as noted below relates to converting the readily available pine resin acids to materials having androgenic activity, which materials may be further converted to natural cyclopentano polyhydrophenanthrene type of hormones. They are described and claimed in copending applications Serial No. 610,623 now Patent No. 2,830,093; Serial No. 610,624 now Patent No. 2,830,094; Serial No. 428,852 now Patent No. 2,830,075; Serial No. 610,625 now Patent No. 2,830,074 and Serial No. 390,747 now abandoned (refiled as the present application Serial No. 647,986).

In this overall process an ester derivative of a pine resin acid is converted to a tertiary carbinol by Grignard reaction.

In this connection there are included an improved method for obtaining high yields of carbinol of the order of 95% of theory by operation at elevated temperatures with high boiling solvents, and also a novel method of recovery of the high yield of desired carbinol products in substantially pure form by degradation and removal of the unreacted acid esters therefrom, and also a method for rearranging and dehydrating the tertiary carbinol product to corresponding tertiary diphenyl methyl compounds. These novel features and intermediate compounds are described and claimed in copending application Serial No. 610,623, filed Sept. 18, 1956 now Patent No. 2,830,093 as a continuation-in-part of application Serial No. 416,433, filed March 15, 1954, as a continuation-in-part of application Serial No. 198,893, filed Dec. 2, 1950, both now abandoned.

The class of nuclearly monounsaturated tertiary carbinols obtained thereby are converted to corresponding saturated halides by halogenation or hydrohalogenation which features and carbinol halide products are described and claimed in copending application Serial No. 610,624, filed Sept. 18, 1956 now Patent No. 2,830,094, as a continuation-in-part of application Serial No. 416,434, filed March 15, 1954, as a continuation-in-part of application Serial No. 198,894, filed Dec. 2, 1950, both now abandoned.

The resulting carbinol halides and the corresponding C-ring aromatized tertiary carbinols (obtained as above from the corresponding aromatized pine resin acids) are subjected to selective oxidation which converts the 2-side chain of the polyhydrophenanthrene tertiary carbinol to an alpha carbonyl group, which features and carbinol products are described and claimed in application Serial No. 428,852, filed May 10, 1954 now Patent No. 2,830,075, as a continuation-in-part of application Serial No. 198,895, filed Dec. 2, 1950, now abandoned.

The carbinol in the material obtained by any of the above discussed methods is rearranged and dehydrated to provide a tertiary diphenyl methyl compound, an (8:14) unsaturated double bond is formed by removal of elements of water from the rearranged carbinol and the resulting compounds are oxidized on the active methylene group thereby formed, which is adjacent to the said tertiary diphenyl methyl group, to provide the corresponding alpha-beta unsaturated 7-keto polyhydrophenanthrene compounds, which are shown to have androgenic and anabolic activities, which features and compounds are described and claimed in the application Serial No. 610,625, filed Sept. 18, 1956 now Patent No. 2,830,074, as a continuation-in-part of application Serial No. 441,646, filed July 6, 1954, which is a continuation-in-part of application Serial No. 198,892, filed Dec. 2, 1950, both now abandoned.

In the oxidation step, there are obtained as side products corresponding polyhydronapthone propionic acids and lactones, and these may be converted to the corresponding above mentioned 7-keto polyhydrophenanthrene compounds by treatment with an acetylating agent as by treatment with phenyl acetate-sodium hydride reagent (or with methyl halide magnesium salts) which features and intermediate polyhydronapthalene compounds are described and claimed in the present application filed as a continuation-in-part of application Serial No. 390,747, filed Nov. 6, 1953, as a continuation-in-part of application Serial No. 260,231, filed June 6, 1951, both now abandoned.

The above mentioned 7-keto polyhydrophenanthrenes may be converted to suitable corresponding acetic- or propionic-acid ester derivatives which may be cyclyzed to corresponding known cyclopentanopolyhydrophenanthrene hormone intermediates, which may be converted by well known methods to natural steroid hormones.

In these fields, two types of nomenclature and numbering are established, (1) in terms of the structural isomers of the abietyl and d-pimaryl types wherein the tricyclic numbering is shown in the formulas given as carbon skeletons

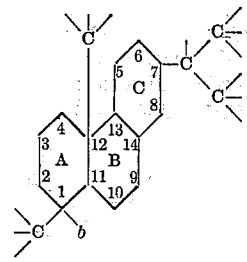

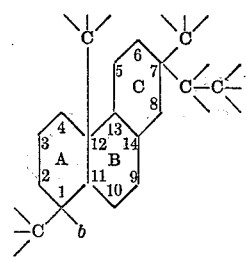

wherein $b$ is a tertiarily bound group such as —COOR, —COHPh$_2$ and —CH$_2$OH, —CH$_2$NH$_2$, wherein R and Ph have the definition defined herein and (2) in terms of a polyhydrophenanthrene nomenclature and numbering, wherein the tricyclic numbering is as shown in the same carbon skeletons, as shown in the formula below, both of which are used herein to conform with both as used in Fieser and Fieser, Natural Products Related to Phenanthrene, Chap. 2, 3rd ed., Reinhold Publ. Co., New York, N.Y., see pp. 41, 64 and 85, thereof, particularly

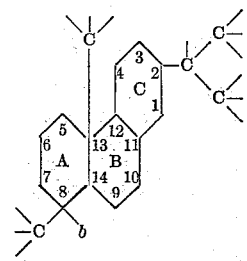

The foregoing may also be summarized as follows:

In the above formulas it is noted that with respect to the structural element defining the 2-nuclear carbon atom substituents in the abietyl and d-pimaryl types of starting compounds, the 1 and 2 nuclear carbon atoms comprise with the carbon atoms of the substituents an isopentyl type of 5 carbon atom skeleton in the side chain of which an α-carbon (relative to the 2-nuclear carbon atom) has attached to it one hydrogen and a group with a β carbon atom

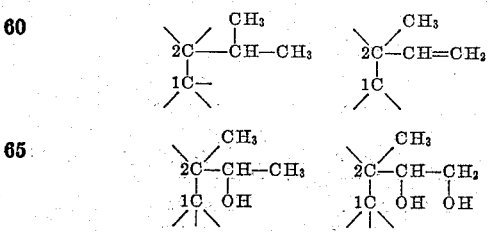

and said side chain (or its corresponding hydrate) on oxidation provides an (α-carbonylated) group —COCH$_3$ or —COOH. From another point of view the 2-substituent is noted to be an aliphatic group having at least two and at most three carbon atoms the α-carbon of which being bonded directly to one hydrogen and being bonded to at least one other hydrogen through an intermediate atom, said intermediate atom corresponding to an atom of a carbonyl group.

The genus relationship of the d-pimaryl and abietyl types is evident further in the spontaneous conversion of d-pimaric acid to levopimaric acid, c.f. L. Ruzicka, Experentia 9 357–67 (1953), and E. Wenkert, Chemistry and Industry 282–4 (1955) wherein it is indicated that the 2-vinyl, 2-methyl groups of d-pimaric are converted to isopropyl directly and also by way of the hydrated intermediates 2-hydroxy-ethyl, 2-methyl groups e.g.

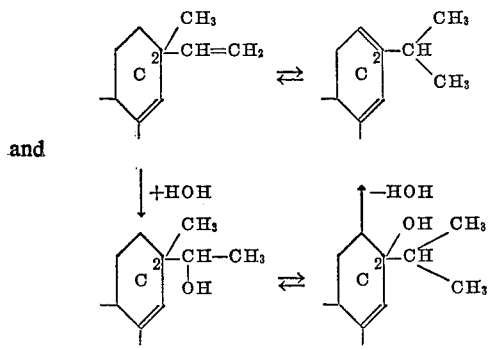

and

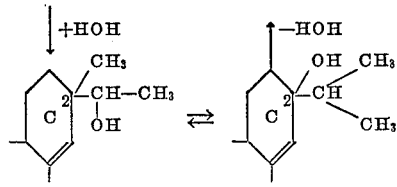

I claim:
1. A process for the manufacture of a member of the group consisting of the dihydro-, octahydro-, 3-methylheptahydro-, the 5-keto-derivatives of an acid and the ring mono-hydrohalide and dihalide derivatives of said acid and its hexahydro- and 3-methyl-pentahydro-derivatives, said acid being represented by the formula

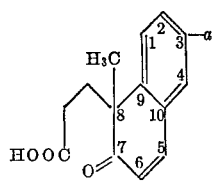

wherein $a$ represents a member of the group consisting of —COCH$_3$ and —COOR, wherein R is a member of the group consisting of the hydrogen, alkyl and aryl radicals, from a corresponding derivative of a tertiary diphenyl carbinol, said carbinol being represented by the formula

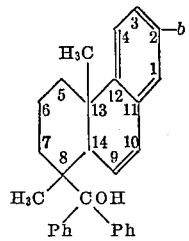

wherein Ph represents phenyl, and $b$ represents a member of the group consisting of

—CH(CH$_3$)$_2$, —CHOHCH$_3$
—CHOHCH$_2$OH, —COCH$_3$ and —COOR, the nucleus of which carbinol is resistant to rupture by oxidation under the process conditions, wherein the 13-angular methyl and 8-tertiary carbinol groups are in trans relationship, which process comprises oxidizing said carbinol reactant with an inorganic hexavalent chromium compound at a temperature in the range of about 5° to about 150° C.

2. A process of claim 1, wherein the acid is subjected to the action of a dehydration agent selected from the group consisting of sulfuric and phosphoric acids and their anhydrides, acetic and propionic acids and anhydrides thereof and their acid halides, phthalic anhydride, and p-toluene sulfonic acid, whereby the acid is converted to the corresponding lactone, said corresponding lactone being selected from the group consisting of a lactone having the formula

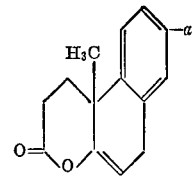

and its hexahydro, 3-methylpentahydro and 5-keto derivatives and the ring monohydrohalide and dihalide derivatives of the tetra-hydro- and 3-methyltrihydro-derivatives thereof.

3. A process of claim 1, wherein there is added with the inorganic hexavalent chromium compound an inorganic orthophosphate compound.

4. A process of claim 1, followed by mixing a member of the group consisting of the ring monohydrohalide and dihalide derivatives of said acid and hexahydro- and 3-methyl pentahydro-derivatives with a halogen removing agent selected from the group consisting of zinc and acetic acid, pyridine, collidine and alkali iodides and alcohols, whereby a dehalogenated compound is produced which is a member of the group consisting of an acid represented by the formula

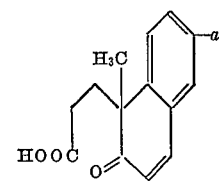

and its tetrahydro-, hexahydro- and the 3-methyl-pentahydro-and-heptahydro-derivatives thereof wherein $a$ represents a member of the group consisting of —COCH$_3$ and —COOR, wherein R is a member of the group consisting of hydrogen, alkyl and aryl radicals.

5. A process of claim 2, followed by mixing a member of the group consisting of the ring monohydrohalide and dihalide derivatives of the tetrahydro- and 3-methyltrihydro-derivatives of a lactone represented by the formula

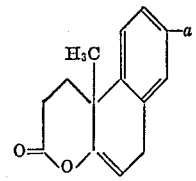

wherein $a$ represents a member of the group consisting of —COCH$_3$ and —COOR, wherein R is a member of the group consisting of hydrogen, alkyl and aryl radicals, with a halogen removing agent selected from the group consisting of zinc and acetic acid, pyridine, collidine and alkali iodide and alcohols, whereby a dehalogenated compound is produced which is a member of the group consisting of the tetrahydro- and 3-methyltrihydro-derivatives of said lactone.

6. A process wherein the carbinol

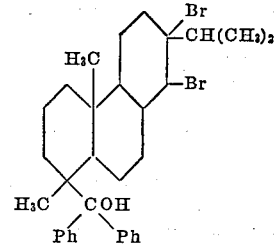

wherein Ph represents phenyl, is oxidized with an inorganic hexavalent chromium compound at a temperature in the range of about 5° to about 150° C. and thereby converted to the acid

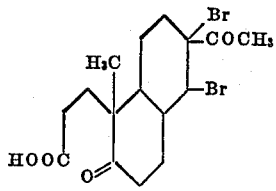

7. A member of the group consisting of an acid and its dihydro-, tetrahydro-, hexahydro- and octahydro-derivatives, the corresponding 3-methyl-monohydro-, trihydro-, pentahydro-and-heptahydro-derivatives, the 5-keto-derivative of each of said compounds and the ring mono-hydro-halide and dihalide derivatives of the said acid and its hexahydro- and 3-methyl-pentahydro-derivatives and the corresponding lactone of each of said acid and its said derivative, said acid being represented by the formula

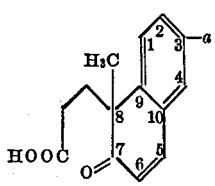

and its said corresponding lactone being represented by the formula

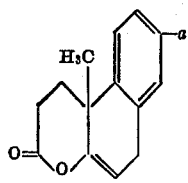

wherein *a* represents a member of the group consisting of —COCH$_3$ and —COOR, wherein R is a member of the group consisting of the hydrogen, alkyl and aryl radicals.

8. The compound

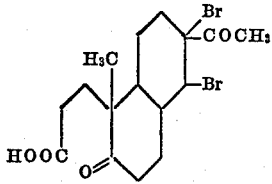

9. The compound

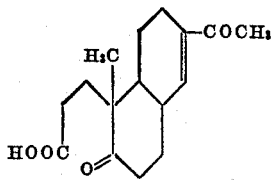

10. The compound

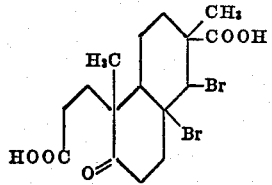

11. The compound

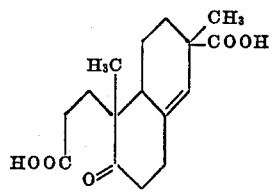

12. The compound

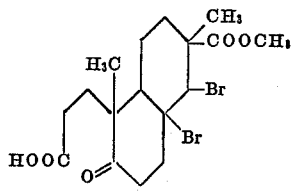

13. The compound

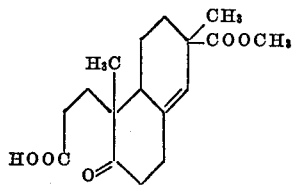

14. The compound

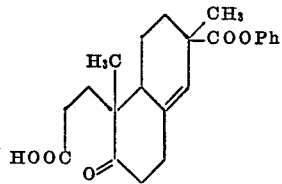

wherein Ph is phenyl.

15. The compound

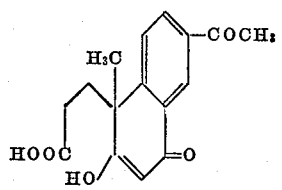

16. The compound

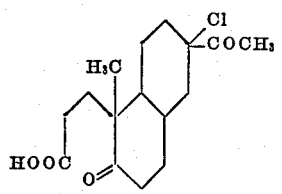

References Cited in the file of this patent
UNITED STATES PATENTS 2,632,025   Grob _____ Mar. 17, 1953
2,855,404   Richards _____ Oct. 7, 1958